(12) United States Patent
Puthillathe et al.

(10) Patent No.: US 10,664,292 B2
(45) Date of Patent: May 26, 2020

(54) WEB-BASED GRAPHICAL USER INTERFACE DISPLAY SYSTEM

(71) Applicant: Dell Products L.P., Round Rock, TX (US)

(72) Inventors: Chandrasekhar Puthillathe, Bangalore (IN); Rama Rao Bisa, Sobha (IN); Rajeshkumar Ichchhubhai Patel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 16/033,011

(22) Filed: Jul. 11, 2018

(65) Prior Publication Data
US 2020/0019417 A1 Jan. 16, 2020

(51) Int. Cl.
G06F 3/0481 (2013.01)
G06F 9/451 (2018.01)
H04L 29/08 (2006.01)
G06F 16/958 (2019.01)

(52) U.S. Cl.
CPC ............ *G06F 9/452* (2018.02); *G06F 3/0481* (2013.01); *G06F 16/986* (2019.01); *H04L 67/12* (2013.01)

(58) Field of Classification Search
None
See application file for complete search history.

(56) References Cited

U.S. PATENT DOCUMENTS 8,819,779 B2 * 8/2014 Chandrasekhar ....... G06F 21/70 726/3
2003/0069953 A1 * 4/2003 Bottom ............... H04L 41/0681 709/223
2019/0187909 A1 * 6/2019 Pinto ................... G06F 11/3034

\* cited by examiner

*Primary Examiner* — Tuan S Nguyen
(74) *Attorney, Agent, or Firm* — Haynes and Boone, LLP (57) ABSTRACT

A web-based graphical user interface system includes an embedded controller in a chassis that couples to a physical display device and input device, and creates a virtual display device and input device. When an input is received from the physical input device, the embedded controller generates a virtual input on the virtual input device. A chassis management controller in the chassis is coupled to the embedded controller, and views the virtual display device and input device as local devices. The chassis management controller may render a web-based graphical user interface and direct it to the virtual display device such that it is transmitted to the embedded controller for display on the physical display device. The chassis management controller may also identify the virtual input generated by the embedded controller on the virtual input device and, in response, translates the virtual input into a web-based graphical user interface event.

20 Claims, 6 Drawing Sheets

WEB-BASED GRAPHICAL USER INTERFACE DISPLAY SYSTEM

BACKGROUND

The present disclosure relates generally to information handling systems, and more particularly to the display of web-based graphical user interfaces for managing information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided using a multi-devices chassis that house multiple computing devices. These types of information handling systems may allow for local management of their computing devices via a Keyboard Video Mouse (KVM) feature that allows an embedded controller in the multi-devices chassis to provide images generated by any of the computing devices for display on a display device that is locally connected to the multi-device chassis via the KVM feature. These types of information handlings systems often include a chassis management controller that is represented in the information handling system as one of the computing devices. The chassis management controller may be configured to provide a chassis management controller Command Line Interface (CLI) such as, for example, the Remote Access Controller Administrator (RACADM) available from Dell Inc. of Round Rock, Tex., United States, which allows a user to interact with the chassis management controller via the display of the chassis management controller CLI on the locally-connected display device in substantially the same manner as discussed above for the images generated by any of the other computing devices. However, chassis management controllers are now being provided with web-based graphical user interfaces that allow users to interact with the chassis management controller via a network (e.g., the Internet), but those web-based graphical user interfaces are inaccessible locally due to limitations in the image provisioning techniques discussed above.

Accordingly, it would be desirable to provide an improved web-based graphical user interface display system.

SUMMARY

According to one embodiment, an Information Handling System includes a first controller that is configured to couple to a physical display device and a physical input device, wherein the first controller is also configured to: create a virtual display device; create a virtual input device; receive an input from the physical input device; and generate a virtual input on the virtual input device; and a second controller that is coupled to the first controller, wherein the second controller is configured to: view the virtual display device and the virtual input device created by the first controller as local devices; render a web-based graphical user interface, and direct the web-based graphical user interface to the virtual display device such that the web-based graphical user interface is transmitted to the first controller for display on the physical display device; and identify the virtual input generated by the first controller on the virtual input device and, in response, translate the virtual input into a web-based graphical user interface event.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
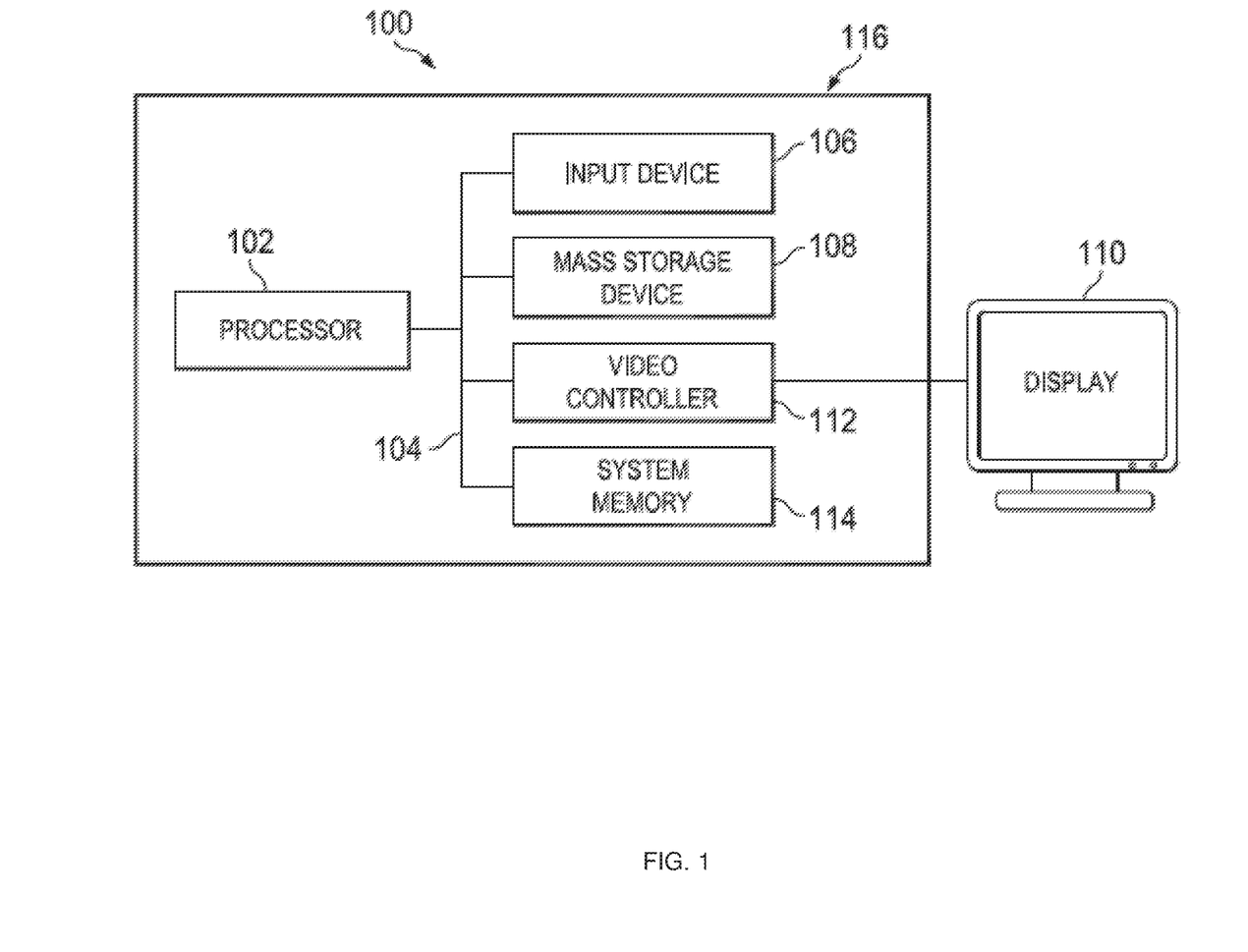
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
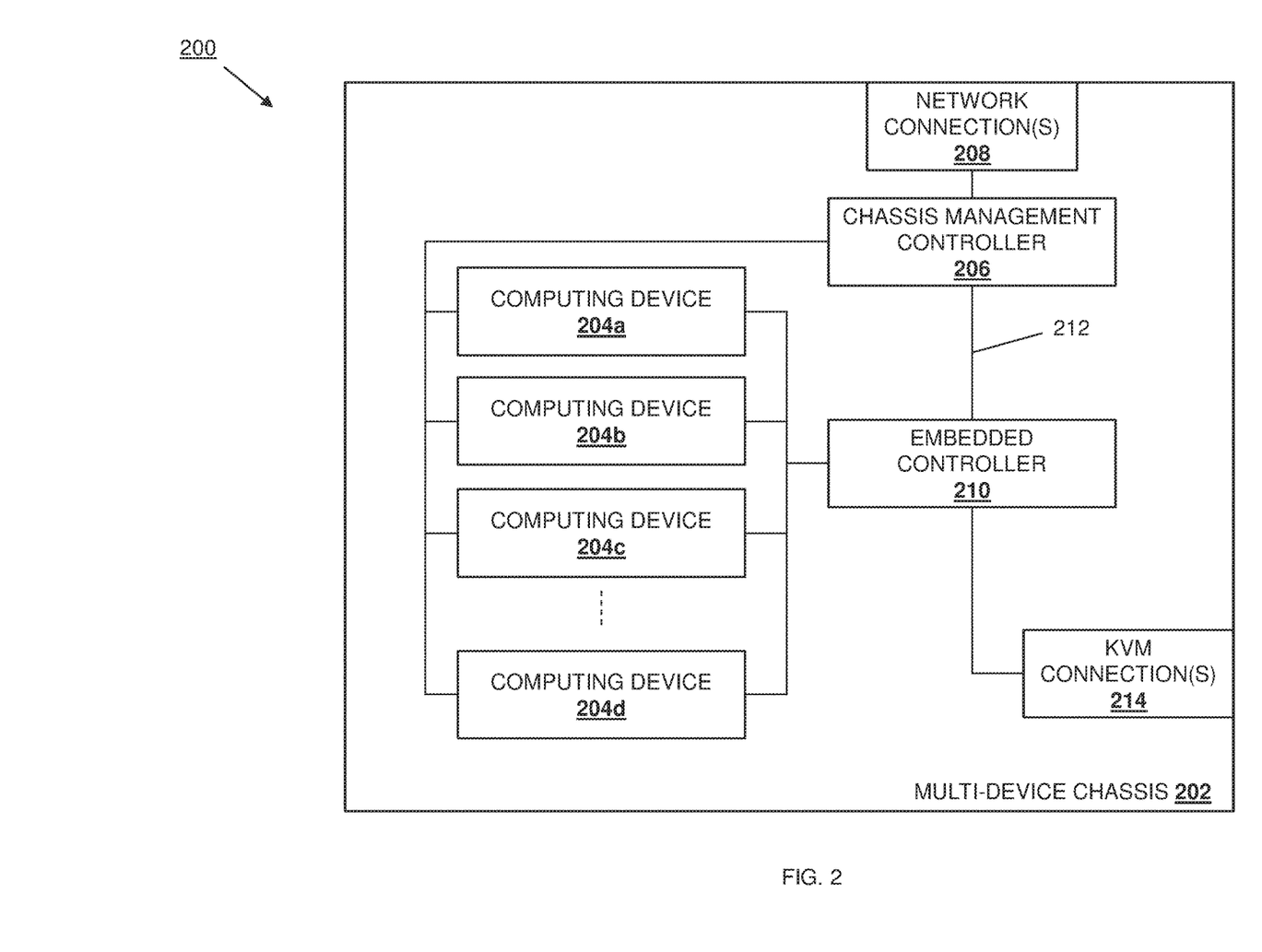
FIG. 2 is a schematic view illustrating an embodiment of a web-based graphical user interface display system.

Referring now to FIG. 2, an embodiment of a web-based graphical user interface display system 200 is illustrated. In the illustrated embodiment, the web-based graphical user interface display system includes a multi-device chassis 202 that configured to house a plurality of computing devices 204*a*, 204*b*, 204*c*, and up to 204*d*. In an embodiment, any or all of the computing devices 204*a-d* may be provided by the IHS 100 discussed above with reference to FIG. 1, and/or may include some or all of the components of the IHS 100. In a specific example, any or all of the computing devices 204*a-d* may be provided by a blade server or other modular server device, although one of skill in the art in possession of the present disclosure will recognize that storage devices, networking devices, and/or other computing devices may fall within the scope of the present disclosure as well. The multi-device chassis 202 may also house a chassis management controller 206 that may be provided by a variety of system management hardware and software that is configured to manage the computing devices 204*a-d*. The chassis management controller 206 may be coupled to one or more network connections 208 that are accessible on the multi-device chassis 202, and that may be configured to connect to a network such as, for example, a Local Area Network (LAN), the Internet, and/or other networks that would be apparent to one of skill in the art in possession of the present disclosure.

The multi-device chassis 202 may also house an embedded controller 210 that may be provided by a variety of microcontrollers that may be configured to handle various system tasks. The embedded controller 210 may be coupled to the chassis management controller 206 via a link 212 which, as discussed below, may be provided by an Ethernet link, although one of skill in the art will recognize that the link 212 may be provided via other link technologies while remaining within the scope of the present disclosure as well. The embedded controller 210 may also be coupled to one or more Keyboard/Video/Monitor (KVM) connections 214 that may be configured to provide a local connection for physical devices to the multi-device chassis 202 and computing devices 204*ad*. For example, the KVM connection(s) 214 may include a physical display device connector that is configured to connect to a physical display device, a physical keyboard device connector that is configured to connect to a physical keyboard device, a physical mouse device connector that is configured to connect to a physical mouse device, other physical input device connectors that are configured to connect to other physical input devices (e.g., physical wireless device connectors that are configured to connect to physical wireless devices that may be configured to provide a wireless connection to a physical display device, a physical keyboard device, a physical mouse device, etc.), and/or any physical device connector that would be apparent to one of skill in the art in possession of the present disclosure. The embedded controller 210 may also be coupled to each of the computing devices 204*a-d*. While a specific web-based graphical user interface display system 200 has been illustrated and described, one of skill in the art in possession of the present disclosure will recognize that the teachings of the present disclosure may be applied to variety of web-based graphical user interface display systems that may include different components and/or component configurations for providing conventional functionality, as well as the functionality discussed below, while remaining within the scope of the present disclosure.

Figure 3:
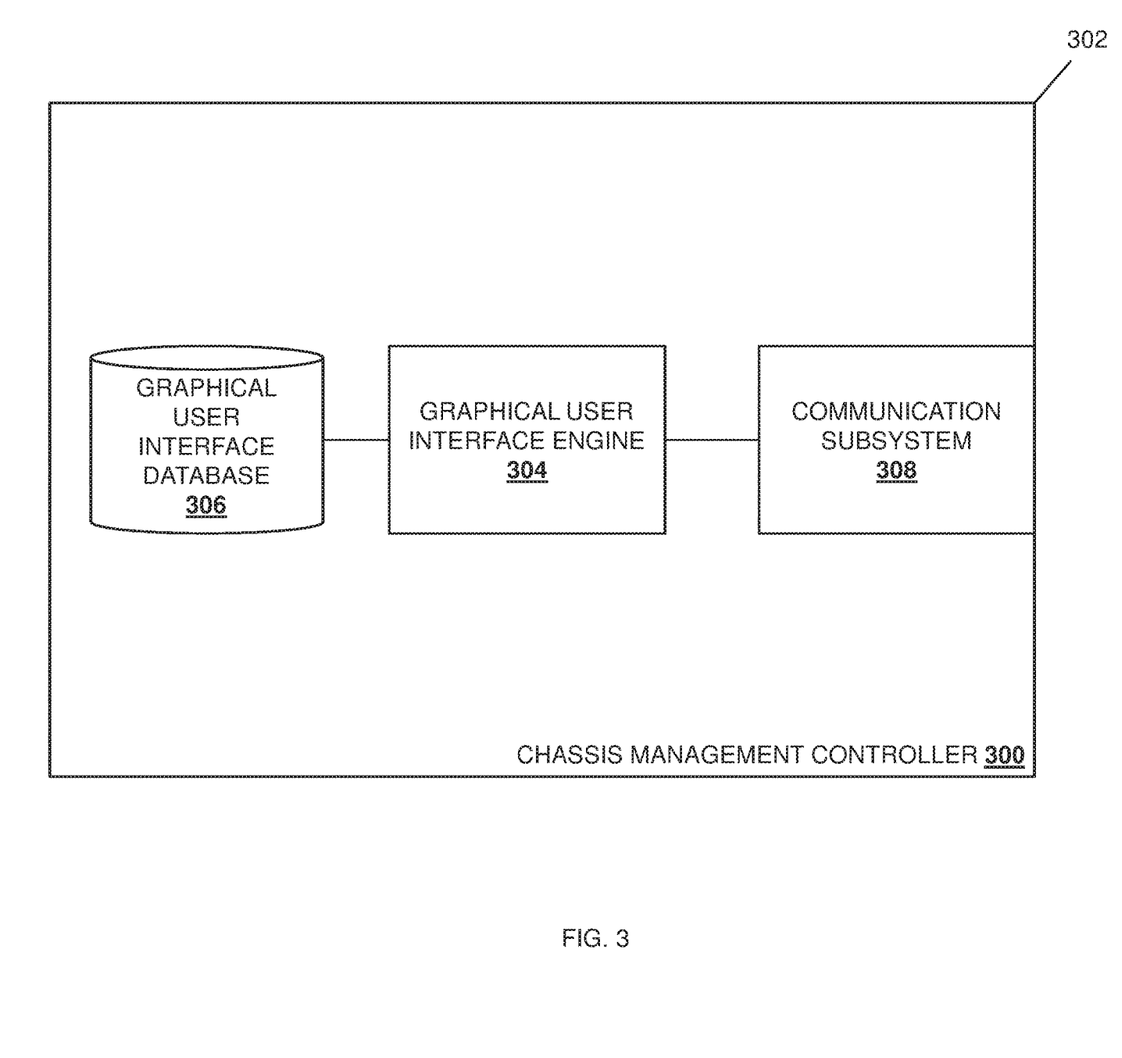
FIG. 3 is a schematic view illustrating an embodiment of a chassis management controller that may be provided in the web-based graphical user interface display system of FIG. 2.

Referring now to FIG. 3, an embodiment of a chassis management controller 300 is illustrated that may be the chassis management controller 206 discussed above with reference to FIG. 2. As such, the chassis management controller 300 may be provided by a variety of system management hardware and software that is configured to manage the computing devices 204*a-d* in the multi-device chassis 200. In the illustrated embodiment, the chassis management controller 300 includes a chassis 302 that houses the components of the chassis management controller 300, only some of which are illustrated in FIG. 3. For example, the chassis 302 may house a processing subsystem (not illustrated, but which may include the processor 102 discussed above with reference to FIG. 1), and a memory subsystem (not illustrated, but which may include the memory 114 discussed above with reference to FIG. 1) that is coupled to the processing subsystem and that includes instructions that, when executed by the processing subsystem, cause the processing subsystem to provide a graphical user interface engine 304 that is configured to perform the functions of the graphical user interface engines and chassis management controllers discussed below. In a specific example, the graphical user interface engine 304 may be provided, at least in part, by a LINUX operating system. However, one of skill in the art in possession of the present disclosure will recognize that other graphical user interface subsystems will fall within the scope of the present disclosure as well.

The chassis 302 may also house a storage subsystem (not illustrated, but which may include the storage device 108 discussed above with reference to FIG. 1) that is coupled to the graphical user interface engine 304 (e.g., via a coupling between the storage subsystem and the processing subsystem), and that includes a graphical user interface database 306 that may store any of the information utilized by the graphical user interface engine 304 as discussed below. The chassis 302 also includes a communication subsystem 308 that is coupled to the graphical user interface engine 304 (e.g., via a coupling between the communication subsystem 308 and the processing subsystem), and that may include a connection (e.g., within the multi-device chassis 202) to the network connection(s) 208, a connection to the link 212 (e.g., the Ethernet link discussed above) to the embedded controller 210, and/or any other connections that would be apparent to one of skill in the art in possession of the present disclosure. While a specific chassis management controller 300 has been illustrated and described, one of skill in the art in possession of the present disclosure will recognize that the teachings of the present disclosure may be applied to variety of controllers that include different components and/or component configurations for providing conventional functionality, as well as the functionality discussed below, while remaining within the scope of the present disclosure.

Figure 4:
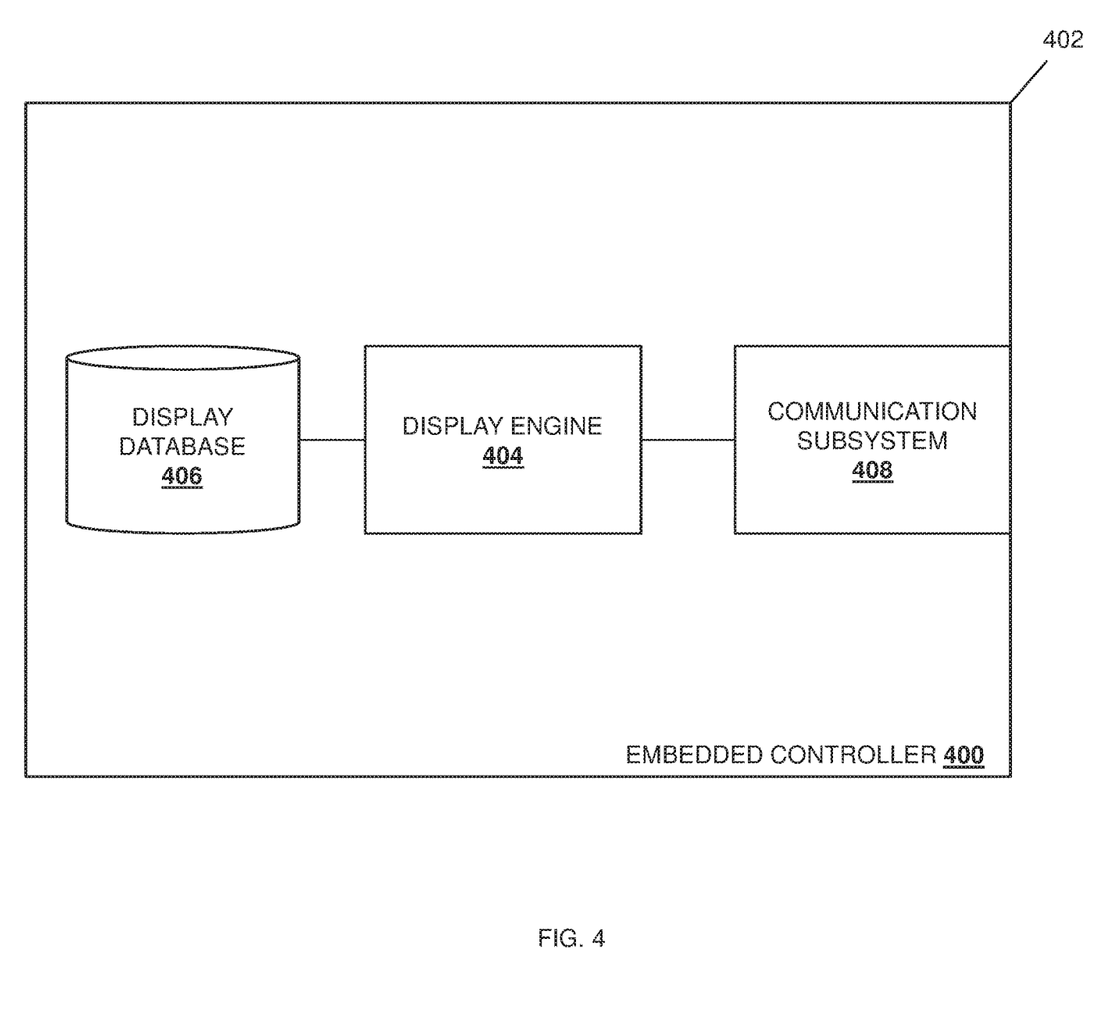
FIG. 4 is a schematic view illustrating an embodiment of an embedded controller that may be provided in the web-based graphical user interface display system of FIG. 2.

Referring now to FIG. 4, an embodiment of an embedded controller 400 is illustrated that may be the embedded controller 210 discussed above with reference to FIG. 2. As such, the embedded controller 400 may be provided by a variety of microcontrollers that may be configured to handle various system tasks in the multi-device chassis 200. In the illustrated embodiment, the embedded controller 400 includes a chassis 402 that houses the components of the embedded controller 400, only some of which are illustrated in FIG. 4. For example, the chassis 402 may house a processing subsystem (not illustrated, but which may include the processor 102 discussed above with reference to FIG. 1), and a memory subsystem (not illustrated, but which may include the memory 114 discussed above with reference to FIG. 1) that is coupled to the processing subsystem and that includes instructions that, when executed by the processing subsystem, cause the processing subsystem to provide a display engine 404 that is configured to perform the functions of the display engines and embedded controllers discussed below.

The chassis 402 may also house a storage subsystem (not illustrated, but which may include the storage device 108 discussed above with reference to FIG. 1) that is coupled to the display engine 404 (e.g., via a coupling between the storage subsystem and the processing subsystem), and that includes a display database 406 that may store any of the information utilized by the display engine 404 as discussed below. The chassis 402 also includes a communication subsystem 408 that is coupled to the display engine 404 (e.g., via a coupling between the communication subsystem 408 and the processing subsystem), and that may include a connection (e.g., within the multi-device chassis 202) to the KVM connection(s) 214, a connection to the link 212 (e.g., the Ethernet link discussed above) to the chassis management controller 206, and/or any other connections that would be apparent to one of skill in the art in possession of the present disclosure. While a specific embedded controller 400 has been illustrated and described, one of skill in the art in possession of the present disclosure will recognize that the teachings of the present disclosure may be applied to variety of controllers that include different components and/or component configurations for providing conventional functionality, as well as the functionality discussed below, while remaining within the scope of the present disclosure.

Figure 5:
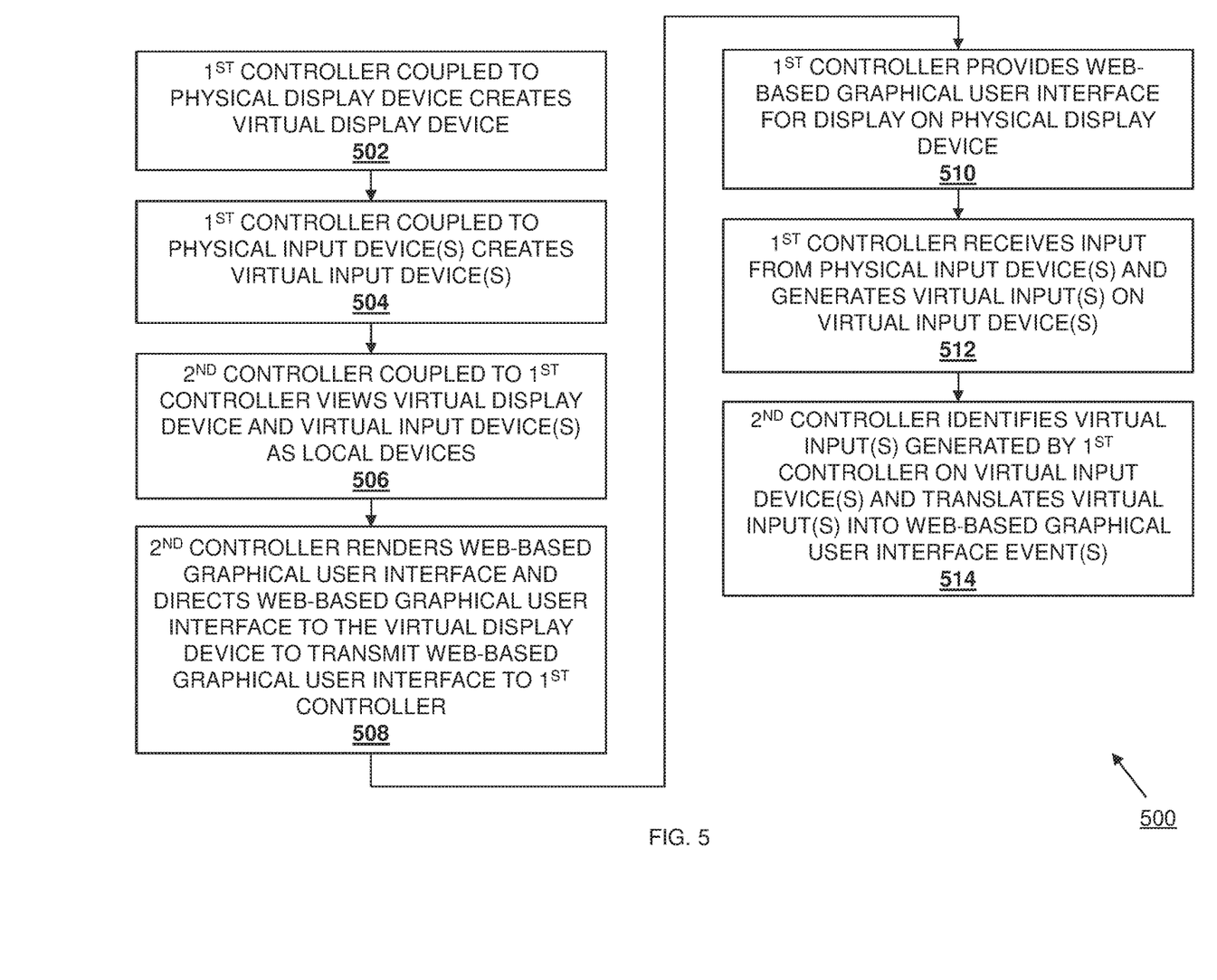
FIG. 5 is a flow chart illustrating an embodiment of a method for displaying a web-based graphical user interface.

Referring now to FIG. 5, an embodiment of a method 500 for displaying a web-based graphical user interface is illustrated. As discussed below, the systems and methods of the present disclosure provide a multi-device chassis with a chassis management controller that includes software (e.g., an X-Windows-based application) that is configured to convert a web-based graphical user interface (e.g., HTML pages) that is provided by the chassis management controller to frame buffer formatted data, and then transmit the frame buffer formatted data to a virtual display device that is viewed by the chassis management controller as a local display device and that is created by an embedded controller coupled to the chassis management controller. The embedded controller receives the frame buffer formatted data that was transmitted to the virtual display device, and provides it to a driver that copies it to a graphics controller memory so that a graphics controller can provide it for display on a physical device that is locally connected to the multi-device chassis. The embedded controller is also configured to emulate virtual input devices (e.g., virtual keyboard devices and virtual mouse devices) for physical input devices that are locally connected to the multi-device chassis, with those virtual inputs devices also viewed by the software on the chassis management controller as local devices. When the embedded controller receive physical inputs to those physical input devices, it generates virtual inputs on the virtual input devices, which are identified by the software on the chassis management controller and translated into a web-based graphical user interface events for the web-based graphical user interface provided by the chassis management controller. As such, web-based graphical user interfaces provided by chassis management controllers may be accessed locally by physical devices connected to a multi-device chassis.

Figure 6:
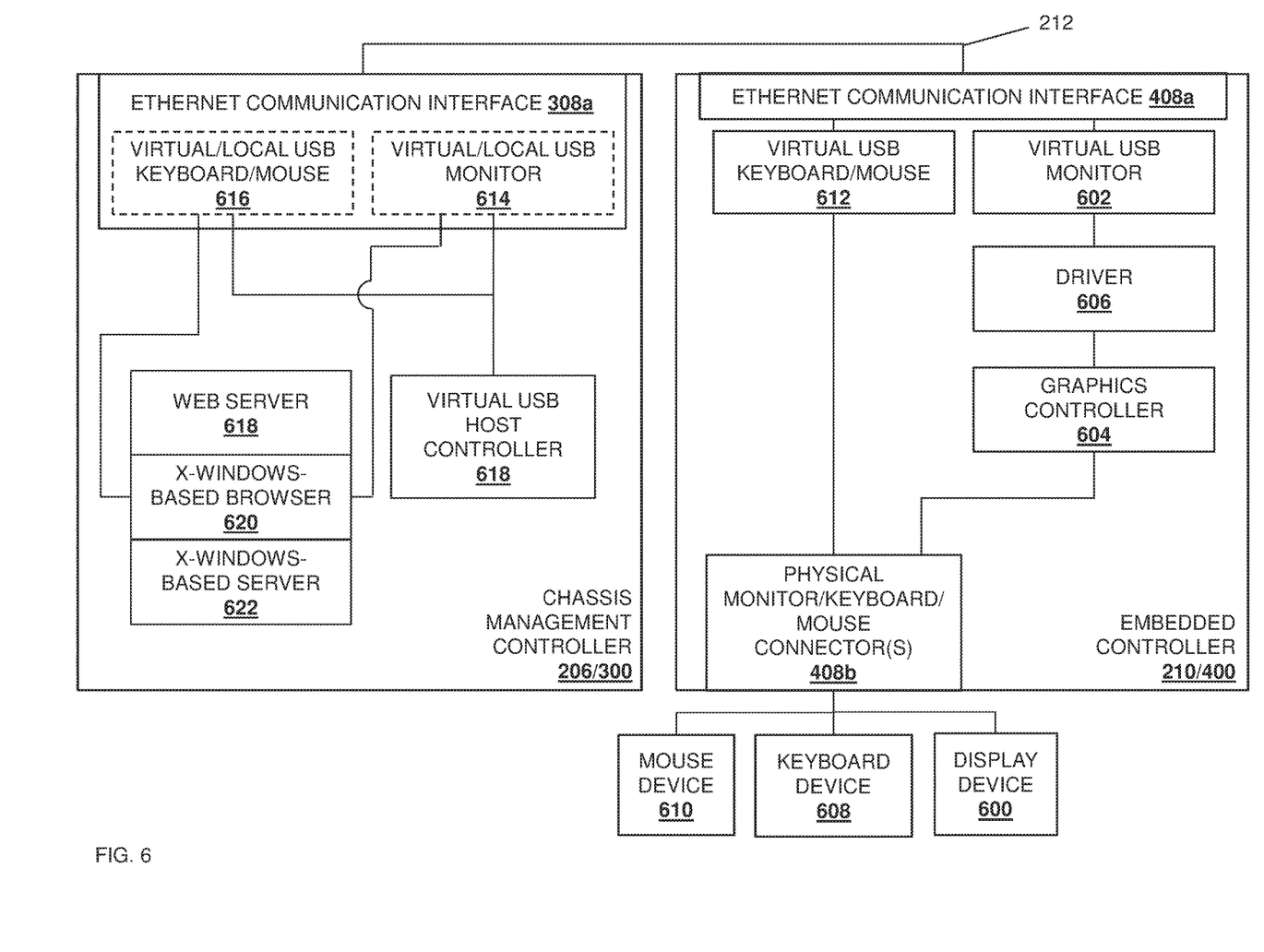
FIG. 6 is a schematic view illustrating an embodiment of the chassis management controller of FIGS. 2 and 3, and the embedded controller of FIGS. 2 and 4, providing for the display of a web-based graphical user interface.

The method 500 begins at block 502 where a first controller coupled to a physical display device creates a virtual display device. With reference to FIGS. 2 and 6, in an embodiment of block 502, a physical display device 600 may be locally connected to the KVM connection(s) 214 on the multi-device chassis 202. FIG. 6 illustrates how the local connection of the physical display device 600 to the KVM connection(s) 214 to the KVM connection(s) 214 couples the physical display device 600 to the embedded controller 210/400 via physical monitor/keyboard/mouse connector(s) 408b provided in the communication subsystem 408 in the embedded controller 210/400. One of skill in the art in possession of the present disclosure will recognize that the local connection of the physical display device 600 to the KVM connection(s) 214 on the multi-device chassis 202, which couple the physical display device 600 to the physical monitor/keyboard/mouse connector(s) 408b provided in the communication subsystem 408, may be provided by physical cables connected to each of the KVM connections(s) 214 and the physical display device 600, local wireless transmitters/receivers provided on each of the KVM connections(s) 214 and the physical display device 600 (e.g., BLUETOOTH® wireless subsystems, Near Field Communication (NFC) subsystems, and/or other wireless subsystems known in the art), and/or via any other local connection technology that would be apparent to one of skill in the art in possession of the present disclosure.

In response to the local connection of the physical display device 600 to the KVM connection(s) 214 on the multi-device chassis 202, the display engine 404 in the embedded controller 210/400 will detect the physical display device 600 coupled to the physical monitor/keyboard/mouse connector(s) 408b provided in the communication subsystem 408 and, in response, may create a virtual display device such as, for example, the virtual Universal Serial Bus (USB) monitor 602 illustrated in FIG. 6 that is coupled to an Ethernet communication interface 408a provided in the communication subsystem 408, as well as to a graphics controller 604 via a driver 606. While each of the graphics controller 604 and the driver 606 are illustrated as provided in the embedded controller 210/400 in FIG. 6 (with the graphics controller 604 coupled to the physical monitor/keyboard/mouse connector(s) 408b), one of skill in the art in possession of the present disclosure will recognize that the graphics controller 604 may be a separate device that is included in the multi-device chassis 202 and coupled to the embedded controller 210/400 while remaining within the scope of the present disclosure as well. For example, in a specific embodiment, the graphics controller 604 may be a graphics controller provided by MATROX® Electronics Systems of Dorval, Quebec, Canada, and may be coupled to the embedded controller 210/400 by an Advanced Microcontroller Bus Architecture (AMBA) High-performance Bus (AHB)-to-Peripheral Component Interconnect (PCI) bridge. Furthermore, the driver 606 may be provided by software included on the embedded controller 210/400, and may be modified (i.e., relative to conventional drivers) to provide for the driver functionality discussed below.

In an embodiment, the creation of the virtual display device (e.g., the virtual USB monitor 602) may include the display engine 404 performing of a variety of virtual display device creation operations. For example, the display engine 404 may read Extended Display Identification Data (EDID) parameters from the physical display device 600 such as a manufacturer name, a serial number, a product type, a phosphor type, a filter type, a display supported timings, a display size, luminance data, pixel mapping data, supported display resolutions, and/or other EDID metadata known in the art, and provide those EDID parameters on the virtual USB monitor 602 created at block 502. While a specific example of the creation of a virtual display device at block 502 has been illustrated and discussed, one of skill in the art in possession of the present disclosure will recognize that virtual display devices may be created by a controller at block 502 in a variety of manners that will fall within the scope of the present disclosure as well.

The method 500 then proceeds to block 504 where the first controller coupled to physical input device(s) creates virtual input device(s). With reference to FIGS. 2 and 6, in an embodiment of block 502, a physical keyboard device 608 and a physical mouse device 610 may be locally connected to the KVM connection(s) 214 on the multi-device chassis 202. FIG. 6 illustrates how the local connection of the physical keyboard device 608 and the physical mouse device 610 to the KVM connection(s) 214 couples the physical keyboard device 608 and the physical mouse device 610 to the embedded controller 210/400 via physical monitor/keyboard/mouse connector(s) 408b provided in the communication subsystem 408 in the embedded controller 210/400. One of skill in the art in possession of the present disclosure will recognize that the local connection of the physical keyboard device 608 and the physical mouse device 610 to the KVM connection(s) 214 on the multi-device chassis 202, which couple the physical display device 600 to the physical monitor/keyboard/mouse connector(s) 408b provided in the communication subsystem 408, may be provided by physical cables connected to each of the KVM connections(s) 214 and the physical keyboard device 608 and/or the physical mouse device 610, local wireless transmitters/receivers provided on each of the KVM connections(s) 214 and the physical keyboard device 608 and/or the physical mouse device 610 (e.g., BLUETOOTH® wireless subsystems, Near Field Communication (NFC) subsystems, and/or other wireless subsystems known in the art), and/or via any other local connection technology that would be apparent to one of skill in the art in possession of the present disclosure.

In response to the local connection of the physical keyboard device 608 and the physical mouse device 610 to the KVM connection(s) 214 on the multi-device chassis 202, the display engine 404 in the embedded controller 210/400 will detect the physical keyboard device 608 and the physical mouse device 610 coupled to the physical monitor/keyboard/mouse connector(s) 408b provided in the communication subsystem 408 and, in response, may create virtual input devices such as, for example, the virtual USB keyboard/mouse 612 illustrated in FIG. 6 that is coupled to the Ethernet communication interface 408a provided in the communication subsystem 408, as well as to the physical monitor/keyboard/mouse connector(s) 408b. While the virtual USB keyboard/mouse 612 is illustrated as a single virtual device, one of skill in the art in possession of the present disclosure will recognize that a separate virtual USB keyboard device and virtual USB mouse device may be created at block 504 while remaining within the scope of the present disclosure as well. In an embodiment, the creation of the virtual input device(s) (e.g., the virtual USB keyboard/mouse 612) may include the display engine 404 performing of a variety of virtual input device creation operations. For example, the display engine 404 may configure itself to operate as a host controller for the virtual USB keyboard/mouse 612 so that physical inputs to the physical input devices cause virtual inputs to be generated on the virtual USB keyboard/mouse 612, discussed in further detail below. While a specific example of the creation of virtual input device(s) at block 504 has been illustrated and discussed, one of skill in the art in possession of the present disclosure will recognize that virtual input devices may be created by a controller at block 504 in a variety of manners that will fall within the scope of the present disclosure as well The method 500 then proceeds to block 506 where a second controller coupled to the first controller views the virtual display device and virtual input device(s) as local devices. In an embodiment, at block 506, the virtual USB monitor 602 and virtual USB keyboard/mouse 612 created by the display engine 404 in the embedded controller 210/300 are accessible by the graphical user interface engine 304 in the chassis management controller 206/300 (and/or other components in the chassis management controller 206/300) via an the Ethernet communication interface 308a in the communication subsystem 308 and over the link 212 (e.g., the Ethernet link discussed above) to the embedded controller 210/400. In particular, the virtual USB monitor 602 and virtual USB keyboard/mouse 612 may be emulated by the embedded controller 210/400 over a LAN provided on the link 212 (e.g., using USB-over-VLAN techniques) to the chassis management controller 206/300. In an embodiment, the chassis management controller 206/300 may not include a USB and/or graphical subsystem, and at block 506 the graphical user interface engine 304 in the chassis management controller 206/300 may create or otherwise provide a virtual USB host controller 618 that is configured to perform device enumeration operations over the link 212 (e.g., via a VLAN provided on the link 212 between the chassis management controller 206/300 and the embedded controller 210/400) for the virtual USB monitor 602 and virtual USB keyboard/mouse 612, which causes the virtual USB monitor 602 and virtual USB keyboard/mouse 612 to be accessible to the graphical user interface engine 304 (and other components of the chassis management controller 206/300) as a virtual/local USB monitor 614 that appears as a locally-connected USB monitor, and a virtual/local USB keyboard/mouse 616 that appears as a locally-connected USB keyboard/mouse, as illustrated in FIG. 6 via dotted lines.

The method 500 then proceeds to block 508 where the second controller renders a web-based graphical user interface and directs the web-based graphical user interface to the virtual display device to transmit the web-based graphical user interface to the first controller. As discussed above, conventional chassis management controllers may provide web-based graphical user interfaces that allow users to interact with the chassis management controller via a network such as the Internet (e.g., via the network connections(s) 208 illustrated in FIG. 202), but those web-based graphical user interfaces are inaccessible locally. However, embodiments of the present disclosure provide for the operation of the graphical user interface engine 304 in the chassis management controller 206/300 to provide a web server 618, an X-Windows-based application such as the X-Windows-based browser 620 illustrated in FIG. 6, and an X-Windows-based server 622, any or all of which are configured to render the web-based graphical user interface (and/or other graphical user interface elements such as JPG files, CSS files, etc.) in a format used by the graphics controller 604 in the embedded controller 210/400, and direct that formatted web-based graphical user interface to the virtual/local USB monitor 614 so that the formatted web-based graphical user interface is transmitted to the embedded controller 210/400 over the link 212.

In a specific example, any or all of the X-Windows-based browser 620 (an X-Windows-based application) hosted on the chassis management controller 206/300, the web server 618, and/or the X-Windows-based server 622, ay operate to render HTML pages (and/or other graphical user interface elements) that provide the web-based graphical user interface (and that are conventionally transmitted over the Internet via the network connection(s) 208). The X-Windows-based browser 620 may then convert the HTML data that provides those HTML pages (and/or other graphical user interface elements) to a frame buffer format that is used by the graphics controller 604 in the embedded controller 210/400. The X-Windows-based browser 620 may then direct the frame buffer formatted HTML data to the virtual/local USB monitor 614. Furthermore, the X-Windows-based browser 620 may also detect a variety of HTML-related events (e.g., a "document load complete" event), and translate those HTML-related events into USB video data transfers that are directed to the virtual/local USB monitor 614. Further still, the X-Windows-based browser 620 may generate partial packets (e.g., packets with less than the bulk endpoint First-In, First-Out (FIFO) size) or zero length packets and direct them to the virtual/local USB monitor 614 to indicate the end of a USB transaction. As would be understood by one of skill in the art in possession of the present disclosure, the directing of data and/or packets to the virtual/local USB monitor 614 will cause that data or those packets to be transmitted over the link 212 to the virtual USB monitor 602 in the embedded controller 210/400.

The method 500 then proceeds to block 510 where the first controller provides the web-based graphical user interface for display on the physical display device. In an embodiment, at block 510, the display engine 404 in the embedded controller 210/400 receives the formatted web-based graphical user interface that was directed to the virtual/local USB monitor 614 by the X-Windows-based browser 620 at block 508, and provides it for display on the physical display device 600. For example, at block 510, the frame buffer formatted HTML data that was transmitted to the virtual USB monitor 602 at block 508 may be provided to the driver 606, which operates to copy the frame buffer formatted HTML data to a graphics controller memory in the graphics controller 604. For example, the frame buffer formatted HTML data may be provided by the X-Windows-based browser 620 in a USB payload, and the driver 606 may extract the frame buffer formatted HTML data from the USB payload, and copy that frame buffer formatted HTML data into the graphics controller memory.

As discussed above, the X-Windows-based browser 620 may generate partial packets or zero length packets, and direct them to the virtual/local USB monitor 614 to indicate an end of a USB transaction. The identification of the end of the USB transaction may indicate to the embedded controller 210/400 to render the frame buffer formatted HTML data, which was copied to the graphics controller memory by the driver 606, on the physical display device 600. As such, following the identification of the end of a USB transaction as discussed above, the graphics controller 604 may provide the frame buffer formatted HTML data that was copied to its graphics controller memory through the physical monitor/keyboard/mouse connector(s) 408b in the communication subsystem 408 and via the KVM connection(s) 214 such that it is displayed on the physical display device 600. As such, following block 510, a user of the physical display device 600 that is locally connected to the multi-device chassis 202 may view the web-based graphical user interface (which is conventionally only viewable via a network connection) on the locally connected physical display device 600.

The method 500 then proceeds to block 512 where the first controller receives input from physical input device(s) and generates virtual input(s) on the virtual input device(s). In an embodiment, at block 512, the display engine 404 in the embedded controller 210/400 may detect a physical input that was provided to the physical keyboard device 608 and/or the physical mouse device 610, and transmitted via the KVM connection(s) 214 and the physical monitor/keyboard/mouse connector(s) 408b in the communication subsystem 408b. In response to detecting the physical input, the display engine 404 in the embedded controller 210/400 may generate corresponding virtual input(s) on the virtual USB keyboard/mouse 612.

The method 500 then proceeds to block 514 where the second controller identifies the virtual input(s) generated by the first controller on the virtual input device(s) and translates the virtual input(s) into web-based graphical user interface event(s). In an embodiment, at block 514, the graphical user interface engine 304 in the chassis management controller 206/300 will identify the virtual input(s) that were generated on the virtual USB keyboard/mouse 612 at block 512 and, in response, translate those virtual inputs into web-based graphical user interface events. For example, a virtual input may have been generated on the virtual USB keyboard/mouse 612 at block 512 in response to a mouse-device-based selection (e.g., a "click") on a hyperlink displayed on the web-based graphical user interface (e.g., a physical input provided using the physical mouse device 610 on a web-based graphical user interface displayed on the physical display device 600 as discussed above), and the identification of that virtual input by the graphical user interface engine 304 in the chassis management controller 206/300 may result in the translation of that virtual input to a web-based graphical user interface event that causes a Universal Resource Locator (URL) defined by the hyperlink to be loaded in a new HTML page (which may then be provided for display on the physical display device 600 in the manner described in detail above.) While a specific HTML page interaction has been described above, one of skill in the art in possession of the present disclosure will recognize that a variety of graphical user interface interactions (e.g., a user logging into the chassis management controller 206/300 by navigating those a "sign-in" graphical user interface, providing authentication credentials, etc.) may be provided according to the teachings of the present disclosure and will fall within its scope as well.

Thus, systems and methods have been described that provide a first controller in a multi-device chassis that is configured to convert a web-based graphical user interface (e.g., HTML pages) to frame buffer formatted data, and then transmit the frame buffer formatted data to a virtual display device that was created by a second controller in the multi-device chassis and that is viewed by the first controller as a local display device. The second controller receives the frame buffer formatted data that was transmitted to the virtual display device, and provides it for display on a physical device that is locally connected to the multi-device chassis. The second controller is also configured to emulate virtual input devices for physical input devices that are locally connected to the multi-device chassis, which are also viewed by the first controller as local devices. When the second controller receive physical inputs to those physical input devices, it generates virtual inputs on the virtual input devices, which are identified by the first controller and translated into a web-based graphical user interface events for the web-based graphical user interface provided by the first controller. As such, web-based graphical user interfaces provided for the multi-device chassis may be accessed locally by physical devices connected to the multi-device chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A web-based graphical user interface display system, comprising:
   a chassis;
   a physical display device connector included on the chassis;
   a physical input device connector included on the chassis; and
   one or more processors that are included in the chassis and that are configured to provide:
      an embedded controller that is configured to couple to a physical display device via the physical display device connector and a physical input device via the physical input device connector, wherein the embedded controller is also configured to:
         create a virtual display device;
         create a virtual input device;
         receive an input from a physical input device that is connected to the physical input device connector; and
         generate a virtual input on the virtual input device; and
      a chassis management controller that is coupled to the embedded controller, wherein the chassis management controller is configured to:
         view the virtual display device and the virtual input device created by the embedded controller as local devices;
         render a web-based graphical user interface, and direct the web-based graphical user interface to the virtual display device such that the web-based graphical user interface is transmitted to the embedded controller for display on the physical display device; and
         identify the virtual input generated by the embedded controller on the virtual input device and, in response, translate the virtual input into a web-based graphical user interface event.

2. The system of claim 1, wherein the chassis management controller is coupled to the embedded controller via an Ethernet interface.

3. The system of claim 1, wherein the embedded controller and the chassis management controller are members of a common Virtual Local Area Network (VLAN).

4. The system of claim 3, wherein the chassis management controller is configured to perform device enumeration operations via the common VLAN and, in response, view the virtual display device and the virtual input device as local devices.

5. The system of claim 1, wherein the embedded controller is configured to read Extended Display Identification Data (EDID) parameters from the physical display device and provide the EDID parameters on the virtual display device.

6. The system of claim 1, wherein the chassis management controller includes an X-Windows-based application that is configured to convert Hyper-Text Markup Language (HTML) data that provides the web-based graphical user interface to a frame buffer format, and provide the frame buffer formatted data to the embedded controller via the virtual display device.

7. An Information Handling System (IHS), comprising:
   one or more processors that are configured to provide:
      a first controller that is configured to couple to a physical display device and a physical input device, wherein the first controller is also configured to:
         create a virtual display device;
         create a virtual input device;
         receive an input from the physical input device; and
         generate a virtual input on the virtual input device; and
      a second controller that is coupled to the first controller, wherein the second controller is configured to:
         view the virtual display device and the virtual input device created by the first controller as local devices;
         render a web-based graphical user interface, and direct the web-based graphical user interface to the virtual display device such that the web-based graphical user interface is transmitted to the first controller for display on the physical display device; and
         identify the virtual input generated by the first controller on the virtual input device and, in response, translate the virtual input into a web-based graphical user interface event.

8. The IHS of claim 7, wherein the second controller is coupled to the first controller via an Ethernet interface.

9. The IHS of claim 7, wherein the first controller and the second controller are members of a common Virtual Local Area Network (VLAN).

10. The IHS of claim 9, wherein the second controller is configured to perform device enumeration operations via the common VLAN and, in response, view the virtual display device and the virtual input device as local devices.

11. The IHS of claim 7, wherein the first controller is configured to read Extended Display Identification Data (EDID) parameters from the physical display device and provide the EDID parameters on the virtual display device.

12. The IHS of claim 7, wherein the second controller includes an X-Windows-based application that is configured to convert Hyper-Text Markup Language (HTML) data that provides the web-based graphical user interface to a frame buffer format, and provide the frame buffer formatted data to the first controller via the virtual display device.

13. The IHS of claim 12, wherein the first controller includes a driver and a graphics controller, and wherein the driver is configured to receive the frame buffer formatted data and copy it to the graphics controller, and the graphics controller is configured to provide the frame buffer formatted data for display on the physical display device.

14. A method for displaying a web-based graphical user interface, comprising:
creating, by a first controller that is coupled to a physical display device, a virtual display device;
creating, by the first controller that is coupled to a physical input device, a virtual input device;
receiving, by the first controller, an input from the physical input device;
generating, by the first controller, a virtual input on the virtual input device;
viewing, by a second controller that is coupled to the first controller, the virtual display device and the virtual input device created by the first controller as local devices;
rendering, by the second controller, a web-based graphical user interface, and directing the web-based graphical user interface to the virtual display device such that the web-based graphical user interface is transmitted to the first controller for display on the physical display device; and
identifying, by the second controller, the virtual input generated by the first controller on the virtual input device and, in response, translating the virtual input into a web-based graphical user interface event.

15. The method of claim 14, wherein the second controller is coupled to the first controller via an Ethernet interface.

16. The method of claim 14, wherein the first controller and the second controller are members of a common Virtual Local Area Network (VLAN).

17. The method of claim 16, further comprising:
performing, by the second controller, device enumeration operations via the common VLAN and, in response, viewing the virtual display device and the virtual input device as local devices.

18. The method of claim 14, further comprising:
reading, by the first controller, Extended Display Identification Data (EDID) parameters from the physical display device and providing the EDID parameters on the virtual display device.

19. The method of claim 14, further comprising:
converting, by an X-Windows-based application included on the second controller, Hyper-Text Markup Language (HTML) data that provides the web-based graphical user interface to a frame buffer format, and providing the frame buffer formatted data to the first controller via the virtual display device.

20. The method of claim 19, further comprising:
receiving, by a driver in the first controller, the frame buffer formatted data and copying the frame buffer formatted data to a graphics controller in the first controller; and
providing, by the graphics controller, the frame buffer formatted data for display on the physical display device.

* * * * *